June 22, 1937.  E. F. DICKIESON, JR  2,084,387
CLUTCH OPERATING MECHANISM
Filed April 4, 1932  3 Sheets-Sheet 2

INVENTOR
Edward F. Dickieson, Jr.
BY
Harness Dickey Pierce & Ham
ATTORNEYS.

Patented June 22, 1937

2,084,387

UNITED STATES PATENT OFFICE 2,084,387

CLUTCH OPERATING MECHANISM

Edward F. Dickieson, Jr., Detroit, Mich., assignor by mesne assignments, to Bendix Products Corporation, South Bend, Ind., a corporation of Indiana Application April 4, 1932, Serial No. 603,031

14 Claims. (Cl. 192—.01)

This invention relates to motor vehicles and has particular relation to actuating mechanism for operating clutches or other auxiliary apparatus thereon.

An object of the invention is to provide mechanism for operating clutches of motor vehicles in such manner that very little skill is required on the part of a vehicle operator in controlling the application of power thereto.

A further object of the invention is to provide a clutch operating mechanism which can be actuated by any unskilled person to engage or disengage clutches automatically and with uniformly perfect execution as only the most highly skilled persons now can do.

Another object of the invention is to eliminate the necessity for the concentration of attention now normally required for operating motor vehicle clutches by providing a clutch operating mechanism which can be operated under all conditions to perfectly execute a complete series of clutch operation.

Another object of the invention is to provide a clutch actuating device which will respond automatically to conditions of operation of an engine which result from the operation of a clutch with which the engine is connected to a motor vehicle.

Another object of the invention is to provide a clutch mechanism actuating device which will automatically respond to conditions in the clutch mechanism produced by its own operation.

Another object of the invention is to provide a manually controlled valve for pneumatically actuated clutch or other operating mechanisms, which is automatically effected by the conditions of operation it produces.

The invention comprises generally a valve actuated by a foot pedal or other similar device and accessible to the vehicle operator for manual operation, for engaging or disengaging a clutch, for example, by which a motor vehicle is driven by the engine thereof. Should the operator desire to disengage the clutch the pedal is depressed and thereafter the disengagement of the clutch is automatically effected. If it is desired to engage the clutch the pedal is released abruptly or otherwise and thereafter the elements of the clutch are automatically and quietly engaged as though the foot pedal had been released with the same degree of skill as is now required in the operation of such clutches.

According to one form of the invention, when the foot pedal is released for engaging the elements of a clutch the valve which is controlled by it, automatically is moved by the effect of intake manifold vacuum thereupon and into such position as to rapidly exhaust the air from a pneumatically operated cylinder by which the clutch mechanism is actuated. When, as a result of the operation of the cylinder, the elements of the clutch tend to engage to any appreciable extent the load on the engine resulting therefrom so effects the pressure in the inlet manifold as to tend to close the valve controlling the operation of the cylinder and the effect of which upon the operation of the clutch is to tend to slow up the rates at which the elements of the clutch engage.

In another form of the invention the release of the foot pedal likewise permits the operation of a valve to exhaust the air from a pneumatically actuated cylinder for actuating the vehicle clutch mechanism and the valve responds to the change which it produces in pressures in the cylinder. For example, as soon as atmospheric air begins to flow into the cylinder the valve is moved in such position as to throttle the flow of air in proportion to the increase in pressure within the cylinder. When the clutch elements engage to a slight extent the force tending to cause the flow of air into the cylinder, is immediately relieved and consequently the pressure in the cylinder rises abruptly. This change in pressure produces a further effect upon the valve, tending to shut off the flow of air into the cylinder and thereafter the clutch elements engage easily as a further small quantity of air is admitted to the cylinder.

The valves in each instance are provided with springs or other adjustable mechanism by which the proper rate of engagement is obtained by the effect thereof upon the operation of the automatic valve.

For a better understanding of the invention, reference may now be had to the accompanying drawings, in which.

Figure 1:
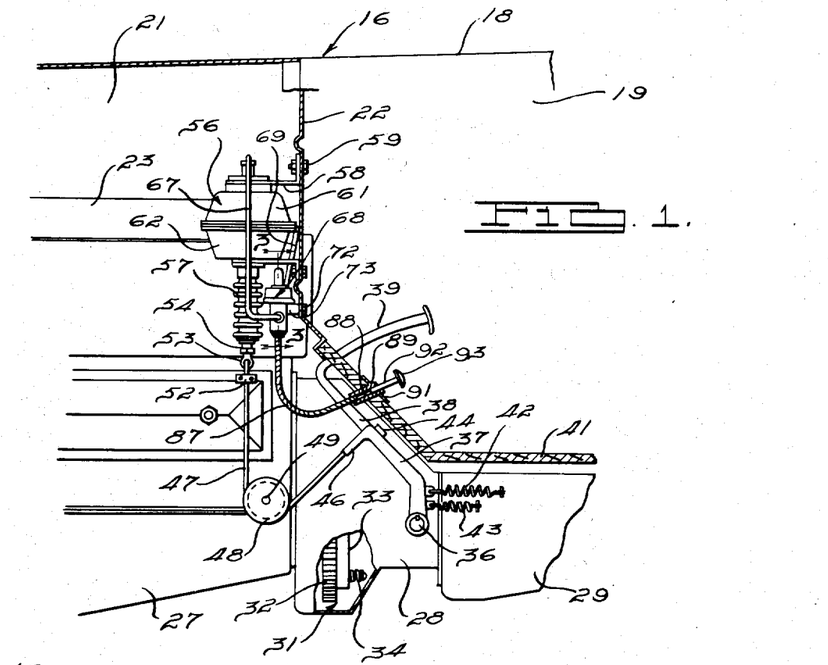
Figure 1 is a fragmentary view of a motor vehicle, in which a clutch actuating mechanism embracing the principles of the invention is employed.
Figure 2:
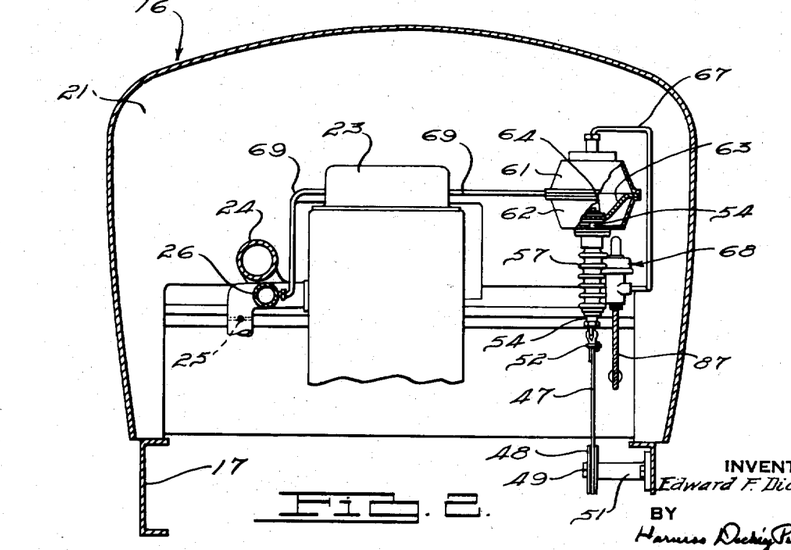
Figure 2 is a fragmentary cross-sectional view taken from directly in front of the engine, in the motor vehicle illustrated by Fig. 1.

Referring particularly to Figures 1 and 2, the motor vehicle 16 employed in practicing the invention comprises a frame 17 supporting a body 18 embracing a passenger compartment 19 and an engine compartment 21 separated principally by a partition or dash 22.

An engine 23 supported on the vehicle frame 17 in the engine compartment 21 is provided with the usual exhaust manifold 24 and air inlet manifold 26 and throttle 25 by which the products of combustion are delivered from and supplied to the engine respectively. The lower portion of the engine comprises a crank case 27 having a clutch housing 28 projecting rearwardly therefrom which in turn supports a transmission housing 29 from which projects the propeller shaft for driving the vehicle in response to the operation of the engine. A clutch 31 contained within the housing 28 comprises a driving element 32, connected directly to the engine 23, and a driven element 33, connected to the propeller shaft by the transmission mechanism contained within the casing 29. These elements are held in frictional engagement under normal conditions of operation by clutch springs such as that indicated at 34.

For disengaging the elements of the clutch to thus permit the engine and the vehicle to run independently of one another, there extends from the clutch housing 28 a clutch mechanism operating shaft 36 having rigidly connected to the outer end thereof a clutch operating lever 37. Inside this lever but rotatably mounted on the shaft 36 is another clutch operating lever 38 having a foot pedal portion 39 adapted to project through an opening in the vehicle floor 41.

With the lever 37 in the position indicated in Figure 1, the springs 34 are so released as to permit the engagement of the driving and driven elements of the clutch 31 for driving the vehicle under the influence of the operation of the engine 23. When the lever 37 is depressed from the position indicated in Figure 1, the springs 34 are so compressed as to permit the disengagement of the aforesaid clutch elements and consequently the independent operation of either the vehicle or the engine.

The levers 37 and 38 each are provided with springs 42 and 43 respectively secured between the levers and the transmission housing 29 to maintain the former in an elevated or clutch engaged positions. In order to provide for the manual operation of the clutch 37 by depressing the pedal 39 the lever 38 is provided with a laterally projecting lug 44 which engages the lever 37 when the pedal is depressed. When, however, the lever 37 is depressed for operating the clutch 31, it simply moves away from the lug 44 and by reason of the spring 42 the foot pedal 39 is held in its normally elevated position.

In order to provide for the automatic operation of the clutch 31, the end of the lever 37 is connected, as indicated at 46, to one end of a cable 47, the middle portion of which engages a pulley 48 secured by a bolt 49 and bracket 51 to one side of the frame 17. The opposite end of the cable 47 has a looped end indicated at 52, which is connected in an eye portion 53 formed at the lower extremity of an operating rod 54 of a pneumatically actuated cylinder or servo-motor 56. In order to prevent dirt or other foreign matter from obtaining access to the cylinder 56, the lower end of the operating rod is surrounded by a flexible bellows 57, one end of which is connected to the operating rod and the other to the cylinder. The cylinder 56 is supported by a pair of brackets 58 engaging the opposite ends thereof which are secured to the dash 22 by bolts 59.

The cylinder comprises, principally, a pair of oppositely disposed cups 61 and 62 between the flanged edges of which is secured the outer periphery of a flexible diaphragm 63. The central portion of the diaphragm is engaged between a pair of discs 64 which are secured rigidly to the upper end of the cylinder operating rod 54.

It is to be understood that the specific construction of the cylinder 56 has no relation to the invention other than for the purpose of illustration and that any other equivalent device may be substituted therefor.

In order to create a different pressure upon the opposite sides of the diaphragm 63 the upper end of the cylinder 56 is connected by a conduit 67 with a valve 68 which in turn communicates either with the intake manifold 26 of the engine 23 through a conduit 69, or with the atmosphere surrounding the valve. The valve is supported on the front of the dash 22 adjacent the cylinder 56 by screws indicated at 72 and projecting through the dash into a boss 73 formed on one side of the valve.

Figure 3:
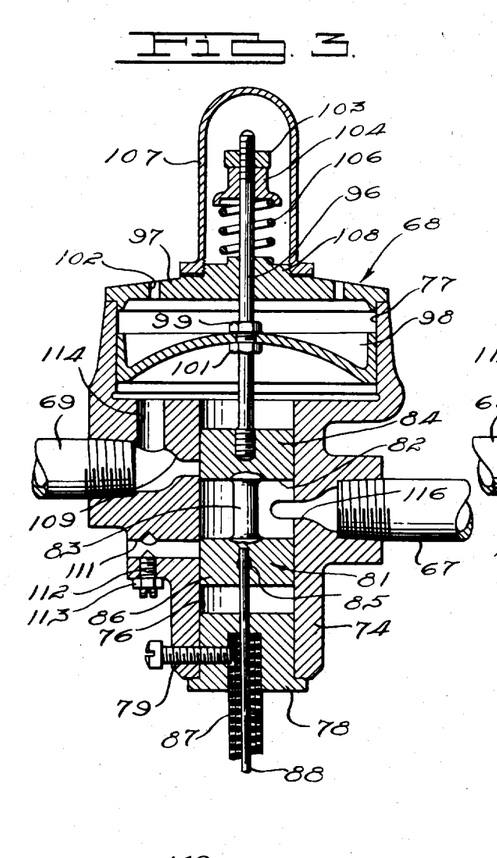
Figure 3 is a cross-sectional view of the automatic clutch controlling valve embraced in the structures illustrated by Figs. 1 and 2, as the valve might appear in the plane of line 3—3 of Figure 1, and looking in the direction of the arrows thereon.
Figure 4:
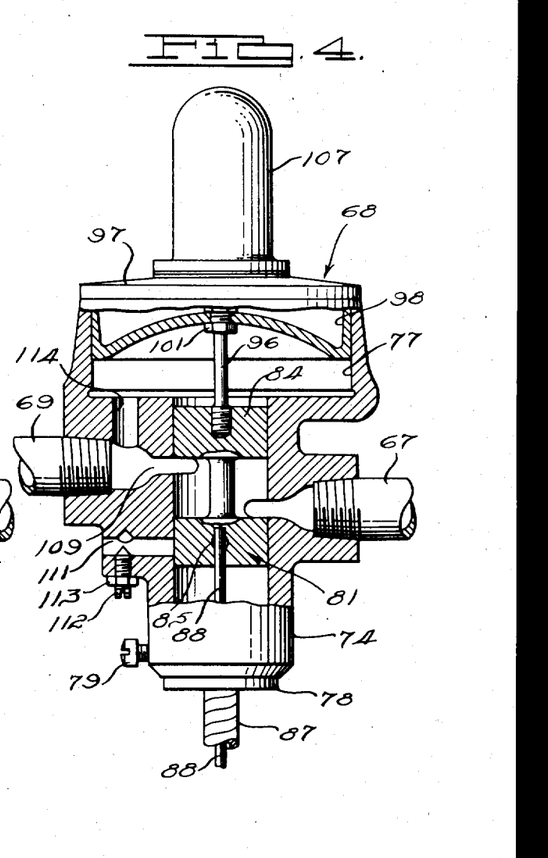
Figure 4 is a similar view of the valve except that only a part of the mechanism thereof is shown in cross section and the elements thereof are in a different operative position.
Figure 5:
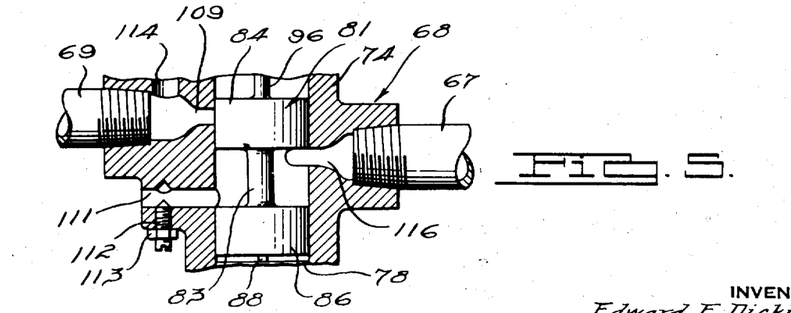
Figure 5 is a fragmentary cross-sectional view of the valve illustrated in cross section by Figures 3 and 4 but with the elements thereof in still another operative position.

In the form of the invention illustrated by Figs. 3, 4, and 5, the valve 68 comprises generally a valve casing 74 having a centrally disposed cylindrical opening 76 formed in a lower portion thereof which communicates at its upper extremity with a considerably larger cylindrical opening 77. The casing 74 is closed at its lower extremity by a head 78 extending into the opening 76 and secured therein by a screw 79 adjustably secured in aligned openings formed in the casing and head for the reception thereof. Slidably disposed within the cylindrical opening 76 is an elongated cylindrical piston valve element 81 having an annular port 82 formed intermediate the ends thereof and around an axially disposed intermediate portion 83 connecting the two valve element ends 84 and 86.

Also secured in position by the screw 79 and in an axial opening formed in the head 78, is one end of a flexible sheath or conduit 87 in which is slidably disposed a flexible wire 88. The wire projects beyond the end of the sheath through an opening in the head 78 and is secured, as is indicated at 85, in an opening formed in one end of the cylindrical valve element 81. The opposite end of the sheath 87 is secured rigidly in the lower end of a cylindrical opening formed in a bracket 89 extending through an opening formed in the vehicle floor 41 and secured rigidly in position therein by a flange 91 projecting therefrom and engaging the upper surface of the floor. In the upper extremity of the cylindrical opening in the bracket 89 and projecting therefrom into the region above the floor, is a cylindrical end 92 of a foot pedal 93. The wire 88 also projects beyond this end of the sheath 87 and is there secured rigidly to the cylindrical end of the foot pedal 93.

Threaded in an axial opening in the upper end of the valve element 81 is a rod 96 projecting upwardly through the cylindrical opening 77 and slidably mounted in the centrally disposed opening formed in a head 97 secured upon the upper end of the casing and closing the opening 77. A piston 98, slidably mounted in the cylindrical opening 77, has an axial opening therein through which the rod 96 projects and is secured rigidly to an intermediate portion of the rod by nuts 99 and 101. The head 97 is provided with a plurality of openings 102 therein for maintaining atmospheric pressure on one side of the piston 98. The upper end of the rod 96 has secured thereon, by a nut 103 engaging the threaded upper end of the rod, a cap 104 for maintaining a spring 106 surrounding the rod 96 under compression against the head 97. The upper end of the rod, spring and cap mechanism is surrounded by a removable cover 107 threaded upon a boss 108 projecting from the upper surface of the head 97.

Formed in one side of the casing 74 and disposed in spaced relation intermediate the opposite extremities of the opening 76 therein, is a pair of ports 109 and 111, the latter of which provides communication between the opening 76 and the atmosphere and is controlled by a needle valve 112 extending thereinto through a threaded opening in the casing which is adjustably secured in any desired position by a lock nut 113. The opening or port 109 provides communication between the cylindrical opening 76 and the conduit 69 threaded into the casing 74 and communicating with the inlet manifold of the engine 23. The port 109 also communicates through a passage 114 with the cylindrical opening 77 on the side of the piston 98 opposite that exposed to the atmosphere through the ports 102.

The ports 109 and 111 are spaced farther apart than the width of the annular port 82 in the valve element 81, in order to insure that no more than one of the ports in the casing will communicate with the port in the valve element simultaneously. Formed in the casing 74 intermediate the ports 109 and 111 is a third port 116 which is capable of communication with either one or the other of the ports 109 and 111 through the annular port 82. This port in turn communicates with the conduit 67 threaded into the casing 74 and communicating with the cylinder 56.

At the lower limit of movement of the valve element 81 the lower end of the piston 98 engages the surface of the casing 74 at the lower end of the opening 77 and the port 116 communicates with the port 111 through the annular port 82. When the valve element is in its upper limited position the piston 98 engages the head 97 and the port 116 communicates with the port 109. When the valve element is in its intermediate position, the ports 109 and 111 are respectively covered by the ends 84 and 86 of the valve element 81.

With reference to the operation of the aforesaid mechanism it will be observed that the effect of the reduced pressure in the inlet manifold 23 tends to move the piston valve 81 downwardly into such position that the port 111 will communicate with the port 116 and in opposition thereto the spring 106 tends to elevate the piston 81 into such position that the port 109 will communicate with the port 116. In order to balance such tendencies and for obtaining proper conditions of operation, the spring 106 is so adjusted by manipulation of the nut 103 that the highest pressure occurring in the intake manifold during any condition of engine operation will still exert upon the piston 98 a force great enough to prevent the spring 106 from moving the piston valve 81 upwardly far enough for the port 109 to communicate with the port 116. Such maximum pressure in the inlet manifold will occur when an engine is running at maximum speed with wide open throttle or at lower speed when the engine is pulling heavily. Under such conditions the position of the valve element 81 will be not materially higher than is illustrated by Figure 3 in which it is observed the upper end 84 of the valve element still covers the port 109.

Under conditions of operation wherein the inlet manifold pressure is at a minimum value the force affecting the piston 98 will be great enough to compress the spring 106 materially and perhaps to move the piston valve 81 downwardly until its movement is limited by the engagement of the piston 98 with the casing 74 at the lower extremity of the cylindrical opening 77. Under such conditions of operation the port 116 will communicate with the port 111 to a greater or lesser extent.

When it is desired to release the elements of the clutch 31 to permit the independent operation of the engine and the motor vehicle, the vehicle operator merely depresses the pedal 93 to the maximum possible extent. Such depression of the pedal causes the wire 88 to move the valve element 81 and the piston 98 against the force exerted by the reduced pressure in the inlet manifold of the engine and into the upper limiting position thereof wherein the port 109 communicates with the port 116 through the annular port 82. Immediately thereafter the air in the upper part of the cylinder 56 will be exhausted through the valve and the conduits 67 and 69. As a result of such flow of air the diaphragm 63 will move toward the opposite end of the cylinder carrying with it the actuating rod 64 and pulling the cable 47 across the pulley 48 until the lever 37 is depressed to its maximum possible extent and the elements of the clutch are released.

The pedal 93 may be held in this depressed position until the gear shift lever is shifted to an intermediate position or until it is desirable to again permit the engagement of the clutch elements.

When such engagement of the clutch elements is desired the operator releases the pedal 93 abruptly or otherwise and the reduced pressure in the inlet manifold effecting the lower side of the piston 98 immediately moves the piston and valve element 81 downwardly against the force of the spring 106 until the port 109 is covered by the end 84 of the piston valve and thence still further downwardly until the port 111 is uncovered by the movement therebeyond of the end 86 of the piston valve. The farther the valve 81 moves downwardly the greater is the force created by the compression of the spring 106 in opposition to such movement and consequently the force exerted by the reduced pressure in the inlet manifold and tending to move the valve element 81 downwardly eventually is practically balanced by the increased force exerted by the spring and at about the time the port 111 is entirely uncovered.

Thereafter atmospheric air rushes rapidly through the port 111, the passage 82, the conduit 67 and into the upper end of the cylinder 56. The resultant rise in pressure within the cylinder immediately decreases the force tending to hold the clutch in a disengaged position against the springs 34 tending to engage the elements of the clutch and simultaneously as the diaphragm 63 moves downwardly, the elements of the clutch 31 move toward clutch engaging position. As soon as the elements of said clutch become engaged to the slightest extent there is a force transmitted through the clutch tending to drive the vehicle and this force amounts to a load upon the engine. As soon as this load is applied to the engine, the inlet manifold pressure becomes greater than were the load not applied and the force exerted upon the piston 98 in opposition to the force exerted by the spring 106 and tending to close the port 111 is decreased.

As the spring 106 moves the valve 81 to close the port 111 to a greater extent there is a corresponding decrease in the rates of movement of the diaphragm 63 and of the elements into engaged position. The more nearly engaged the elements of the clutch become, the greater is the load upon the engine 23 and the greater is the increase in inlet manifold pressure. Such further increase in inlet manifold pressure more nearly permits the spring 106 to close the port 111 by movement of the valve element 81 and consequently the greater is the throttling of the flow of air to the cylinder 56 and the less rapid the movement of the elements of the clutch into positively engaged or normal driving relation.

When the operator of a vehicle engages the elements of a clutch to place the vehicle in operation, the clutch operating pedal is permitted to rise rapidly until the operator observes a reduction in the resilient force exerted by the clutch and tending to elevate the clutch pedal. At such instances the operator decreases the application of force to the clutch pedal and also progressively slows up the rate of movement of the pedal during the remainder of the clutch engaging movement. In the mechanism embracing this invention the operation of engaging the elements of the clutch is substantially the same as when the clutch is manually actuated except that the valve 68 changes the force and rate of operation of the clutch actuating mechanism in response to the operation of the clutch and hence relieves the vehicle operator of such burden.

The valve 68' disclosed by Figs. 6 to 11 inclusive comprises a casing 121 having a cavity 122 formed in one side thereof communicating through ports 123 and 124 with an intermediate portion and one end respectively of a cylindrical opening 126 formed in the casing along one side of the cavity. In this opening is slidably mounted a piston 127 of such length that when the upper end thereof covers the upper edge of the port 123, the lower end also covers a port 128 formed in the casing on the opposite side thereof. The port 128 communicates with the inlet manifold of the engine 23 through the conduit 69 threadably engaging the casing at the port whereas the cavity 122 communicates with the upper end of the cylinder 56 through the conduit 67 likewise threadably engaging the casing. The port 124 is located far enough from the port 123 to be uncovered by the piston 127 when the latter covers both of the ports 123 and 128.

The piston 127 has threaded axially therein an intermediate portion of an operating rod 129, having above the piston an enlarged portion 131 engaging the end of the piston and slidably mounted in an opening formed in a head 132 which is threaded in the casing 121 at the upper end of the opening 126 and secured in position by a set screw 133. The length of the enlarged portion 131 is such that the upper end thereof is substantially level with the upper surface of the head 132 when the upper extremity of the piston 127 lies just beyond the upper limit of the port 123. The head 132 is provided with a plurality of openings 134 for the admission of air to the upper extremity of the cylindrical opening 126.

Above the enlarged portion 131 there is disposed upon the rod 129 a slidable collar 136, the upper surface of which engages one end of a coil spring 137 surrounding the rod and engaged at its opposite extremity by a collar 138 adjustably secured on the threaded end of the rod by a nut 139. With such construction when the rod 129 is moved to carry the piston 127 upwardly beyond the port 123 the collar 136 merely rides with the upper extremity of the enlarged portion 131 of the rod and consequently the spring 137 is neither compressed nor expanded to a greater extent. However, when the rod 129 is moved downwardly, until the upper edge of the piston 127 passes below the upper limit of the port 123, the collar 136 rests upon the upper surface of the head 132 and compresses the spring 137 during further downward movement of the rod.

The lower end of the rod 129 projects outwardly of the lower end of the casing 121 through a packing gland 141, threadably engaging the casing in such region and therebeyond is secured, as is indicated at 142 to the end of a flexible wire or rod 143. This wire projects from the end of and is slidably mounted in a flexible sheath or covering 144, the upper end of which is secured by a set screw 146 in an opening formed in a bracket 147 projecting downwardly from the casing 121 into the region adjacent the lower extremity of the rod 129. The opposite ends of the flexible sheath 144 and the wire 143 are secured respectively to the bracket 89 and the cylindrical end 92 of the foot pedal 93 exactly as the sheath 87 and wire 88, disclosed in Figs. 1 to 5 inclusive, are secured.

Figures 6, 7, 8, 9, 10, 11:
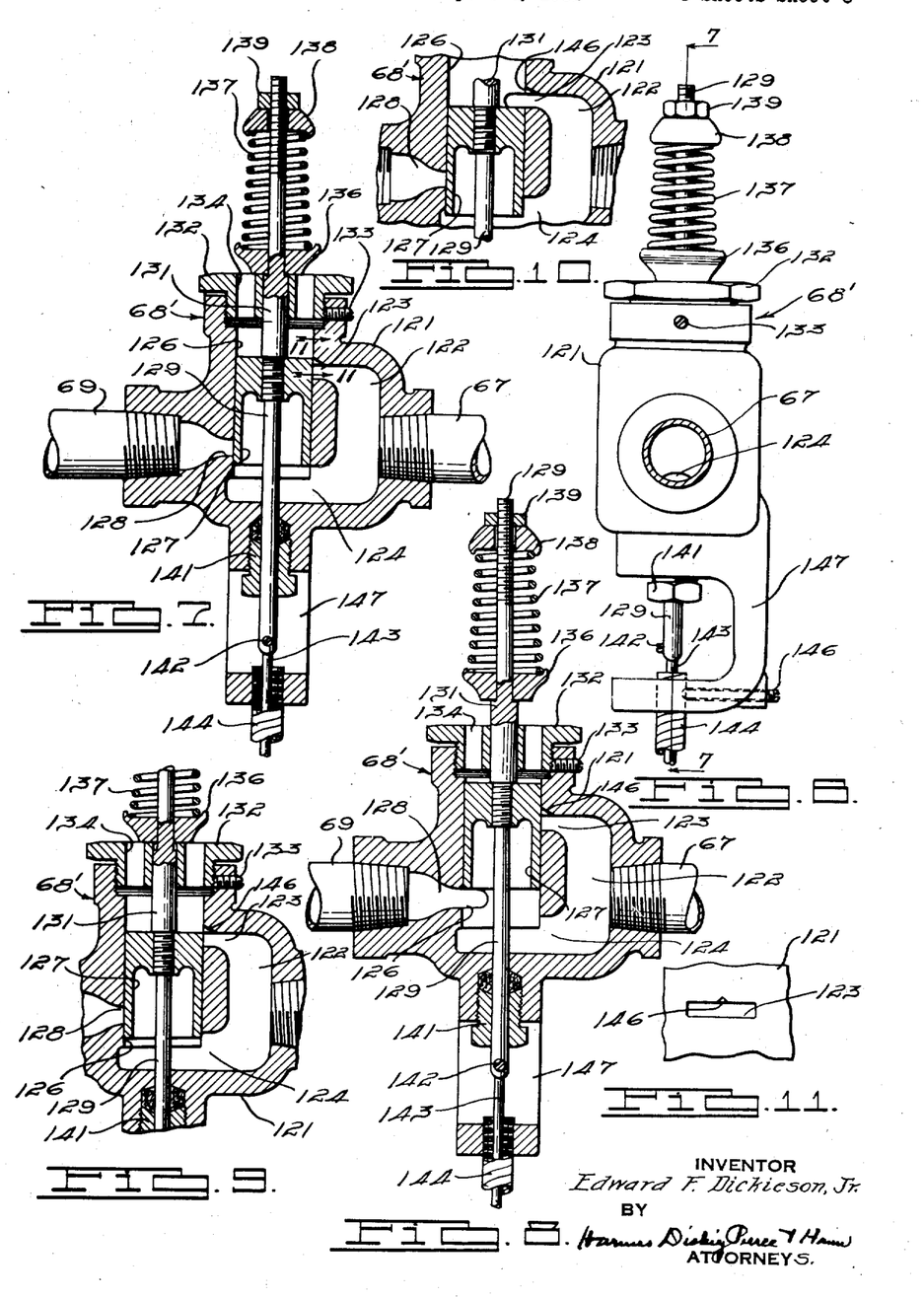
Figure 6 is a side elevational view of another form of valve mechanism embracing the principles of the invention.
Figures 7 and 8 are vertical cross-sectional views of the valve illustrated by Figure 6 as it might appear in the plane of line 7—7 thereof and looking in the direction of the arrows but with the elements of the valve in different operative positions.
Figures 9 and 10 are fragmentary cross-sectional views on line 7—7 of Figure 6, of the valve illustrated by Figures 6, 7, and 8 but with the elements of the valve in other operative positions.
Figure 11 is a fragmentary view illustrating a port embraced in the valve illustrated by Figures 6 to 10 as it might appear from line 11—11 in Figure 7 looking in the direction of the arrows thereon.

As is illustrated by Fig. 7, when the vehicle clutch 31 is engaged the position of the piston 127 is such as to entirely cover the port 123 and the small notch (see Fig. 11) 146 in which the upper edge of the port 123 terminates. In this position the force of the spring 137 is supported by the collar 136 upon the upper extremity of the enlarged portion 131 of the rod 129 either at or directly above the upper surface of the head 132.

When it is desired to disengage the elements of the clutch 31 the vehicle operator depresses the foot pedal 93 to such an extent that the piston 127 is moved upwardly until the port 128 is uncovered to a considerable extent, for example as is illustrated by Fig. 8. In such position the piston, while maintaining the port 123 closed, permits communication between the intake manifold of the engine and the cylinder 56 through the conduits 69 and 67, and the casing 121. Immediately upon the assumption of such position by the piston 127 the pressure between the inlet manifold and the cylinder 56 is equalized and the resultant upward movement of the diaphragm 63 within the cylinder causes the actuation of the clutch operating lever 37 in such manner as to compress the springs 34 to disengage the driving and driven elements of the clutch. The piston is thereafter held in such position until the gear shift lever is moved into neutral position or until it is desired to again permit the engagement of the clutch elements.

When such engagement of the clutch is desired, the operator abruptly, or otherwise, releases the pedal 93 and the difference between atmospheric pressure and the pressure in the interior of the casing 121 moves the piston 127 downwardly into a position, such as that indicated in Fig. 10, in which the port 128 is entirely closed and the port 123 is opened to a large extent. The difference between the atmospheric pressure and the pressure inside the valve casing 121, causing the downward movement of the piston 127, creates a force of compression in the spring 137 which increases in proportion to the movement of the piston 127 downwardly below the upper extremity of the port 123. As the air rushes through the ports 134 and 123 to fill the cylinder 56 and as the pressure inside the casing 121 proportionally increases, the spring 137 will tend to move the piston 127 upwardly to throttle the flow of air through the port 123.

Such throttling of the flow of air through this port appreciably decreases the rate of movement of the diaphragm 63 and likewise the rate of movement of the elements of a clutch 31 into their positively engaged position. When, however, the clutch elements do engage to a slight extent, they tend to relieve slightly the force tending to move the diaphragm 63 away from the upper end of the cylinder 56 and consequently to decrease the rate of increase in the space above the diaphragm tending to cause a continuation in the flow of air through the port 123. This deceleration of the rate of increase in the space above the diaphragm permits a material increase in the pressure inside the casing 121 and the cylinder 56 which reduces the pressure difference between the interior of the casing and the atmosphere tending to hold the piston 127 downwardly against the compression of the spring 137.

The result of such increase in pressure within the casing tends further to close the valve 127 upon the port 123 until the piston occupies substantially the position indicated in Fig. 9 in which only the notch portion 146 of the port 143 is available for the further admission of air to the cylinder. This increased throttling effect upon the flow of air to the cylinder causes a further deceleration of the movement of the diaphragm 63 and in the rate of movement of the clutch elements into a positively engaged position.

The more nearly the clutch elements become positively engaged, the greater is the deceleration in the rate of movement of the diaphragm 63 and the greater is the tendency of the piston 127, under the influence of the spring 137, to close the notch 146 through which air for filling the cylinder 56 in response to the movement of the diaphragm 63 is admitted. After the first slight engagement of the clutch elements the piston 127 tends increasingly to throttle the flow of air to the cylinder which makes possible the engagement of the elements at a constantly decreasing rate.

While the structure herein disclosed constitutes a preferred form and application of the invention, it is to be understood that the structure has numerous modifications and equivalents within the scope of the invention as defined by the appended claims.

I claim:

1. In combination with a motor vehicle having an engine for driving the latter, said engine having an intake manifold for supplying a combustible mixture of fuel and air thereto, of a clutch having a pair of relatively movable elements for connecting or disconnecting said engine and said vehicle, resilient means normally tending to hold said elements in frictional engagement with one another for driving said vehicle, fluid pressure actuated means having a movable clutch operating element adapted to separate said clutch elements in opposition to said resilient means and to permit the engagement of said clutch elements in response to the operation of said resilient means, and fluid pressure actuated means responsive to variations in pressure in said manifold during engagement of said clutch elements for changing the normal rate of engagement of said elements in response to the operation of said resilient means.

2. In combination with a motor vehicle having an engine for driving the latter, said engine having an intake manifold for supplying a combustible mixture of fuel and air thereto, of a clutch having a pair of relatively movable elements for connecting or disconnecting said engine and said vehicle, resilient means normally tending to hold said elements in frictional engagement with one another for driving said vehicle, fluid pressure actuated means having a movable clutch operating element adapted to separate said clutch elements in opposition to said resilient means and to permit the engagment of said clutch elements in response to the operation of said resilient means, and fluid pressure actuated means responsive to variations in pressure in said intake manifold of said engine for changing the normal rate of engagement of said clutch elements in response to the operation of said resilient means.

3. In combination with a motor vehicle having an engine for driving the latter, said engine having an intake manifold for supplying a combustible mixture of fuel and air thereto, of a clutch having a pair of relatively movable elements for connecting or disconnecting said engine and said vehicle, resilient means normally tending to hold said elements in frictional engagement with one another for driving said vehicle, fluid pressure actuated means having a movable clutch operating element adapted to separate said clutch elements in opposition to said resilient means and to permit the engagement of said clutch elements in response to the operation of said resilient means, and fluid pressure actuated means responsive to variations in intake manifold pressure resulting from the engagement of said clutch elements for varying the rate of engagement of said clutch elements in response to the operation of said resilient means.

4. In combination with a motor vehicle engine having a fuel induction passage and a clutch therefor including means constantly urging said clutch toward engaged position, power means operable to move said clutch to disengaged position, means for establishing a pressure differential in said power means to effect disengagement of said clutch, and means cooperatively associated with the third mentioned means for modifying the normal rate of engaging movement of said clutch under the urge of the first mentioned means, in accordance with pressure conditions in said induction passage.

5. The combination with a motor vehicle engine and a clutch therefor provided with an operating member having a normal bias toward clutch engaged position, of a power device connected to the clutch operating member, means under the control of the vehicle operator for establishing a pressure differential in said power device to move said clutch to inoperative position, and co-operating means controlled by engagement of said clutch of such rapidity as to reduce the speed of said engine, during movement of said clutch from inoperative position towards engaged position, for modifying the speed of engagement of said clutch.

6. In combination with a motor vehicle having an engine for driving the latter, said engine having an intake manifold for supplying a combustible mixture of fuel and air thereto, of a clutch having a pair of relatively movable elements for connecting or disconnecting said engine and said vehicle, resilient means normally tending to hold said elements in frictional engagement with one another for driving said vehicle, fluid pressure actuated means having a movable clutch operating element adapted to separate said clutch elements in opposition to said resilient means, duct means connecting said fluid pressure actuated means to said engine inlet manifold, valve means in said duct means for controlling the operation of said fluid pressure actuated means; said valve means having a normal position closing said duct means between said manifold and said fluid pressure actuated means, a first alternative position connecting said manifold with said fluid pressure actuated means, and a second alternative position connecting said fluid pressure actuated means with the atmosphere; and having valve control means including oppositely disposed surface portions affected by fluid pressure, one of said portions being exposed to atmospheric pressure, the other being isolated from the atmosphere and exposed to a fluid pressure effected by the variable engagement of said clutch elements; the differential pressure affecting said control means tending to move said valve means from said second alternative position to said normal position in response to fluid pressure variations effected by the engagement of said clutch elements, and means accessible to the vehicle operator for moving said valve means from said normal to said first alternative position.

7. In combination with a motor vehicle having an engine for driving the latter, said engine having an intake manifold for supplying a combustible mixture of fuel and air thereto, of a clutch having a pair of relatively movable elements for connecting or disconnecting said engine and said vehicle, resilient means normally tending to hold said elements in frictional engagement with one another for driving said vehicle, fluid pressure actuated means having a movable clutch operating element adapted to separate said clutch elements in opposition to said resilient means, duct means connecting said fluid pressure actuated means to said engine inlet manifold, valve means in said duct means for controlling the operation of said fluid pressure actuated means; said valve means having a normal position closing said duct means between said manifold and said fluid pressure actuated means, a first alternative position connecting said manifold with said fluid pressure actuated means, and a second alternative position connecting said fluid pressure actuated means with the atmosphere; and having valve control means including oppositely disposed surface portions affected by fluid pressure, one of said portions being exposed to atmospheric pressure, the other being isolated from the atmosphere and exposed to the fluid pressure in said inlet manifold during the variable engagement of said clutch elements; the differential pressure affecting said control means tending to move said valve means from said second alternative position to said normal position in response to fluid pressure variations effected by the engagement of said clutch elements, and means accessible to the vehicle operator for moving said valve means from said normal to said first alternative position.

8. In combination with a motor vehicle having an engine for driving the latter, said engine having an intake manifold for supplying a combustible mixture of fuel and air thereto, of a clutch having a pair of relatively movable elements for connecting or disconnecting said engine and said vehicle, resilient means normally tending to hold said elements in frictional engagement with one another for driving said vehicle, fluid pressure actuated means having a movable clutch operating element adapted to separate said clutch elements in opposition to said resilient means, duct means connecting said fluid pressure actuated means to said engine inlet manifold, valve means in said duct means for controlling the operation of said fluid pressure actuated means; said valve means having a normal position closing said duct means between said manifold and said fluid pressure actuated means, a first alternative position connecting said manifold with said fluid pressure actuated means and a second alternative position connecting said fluid pressure actuated means with the atmosphere; and having valve control means including oppositely disposed surface portions affected by fluid pressure, one of said portions being exposed to atmospheric pressure, the other being isolated from the atmosphere and exposed to the fluid pressure of said pressure actuated means during the variable engagement of said clutch elements; the differential pressure affecting said control means tending to move said valve means out of said second alternative position and into said normal position in response to fluid pressure variations effected by the engagement of said clutch elements, and means accessible to the vehicle operator for moving said valve means from said normal to said first alternative position.

9. Apparatus of the character described comprising a differential pressure power device having a movable member connected to an operating member of a motor vehicle clutch, a control device movable to establish a pressure differential in said power device to move the clutch elements to inoperative position, said control device being normally maintained in a position to establish pressure equalization in said power device and including means automatically operative upon initial engagement of the clutch elements for retarding the movement of such elements, said means including a valve for controlling the rate of movement of the clutch elements into operative engagement in accordance with the rate of operation of the throttle of the vehicle engine in proportion to the engine speed.

10. The combination with a motor vehicle engine and a clutch therefor, of a differential pressure power device having a movable member connected to an operating member of the clutch, a control device operable to establish a pressure differential in said power device to move the clutch elements to inoperative position, said control device being normally positioned to establish pressure equalization in said power device and including means automatically operative upon initial engagement of the clutch elements for retarding the movement of such elements, said means including a valve for controlling the rate of movement of the clutch elements into operative engagement in accordnace with the rate of operation of the engine throttle in proportion to the engine speed.

11. Apparatus of the character described comprising a power device connected to an operating member of a motor vehicle clutch, control means movable to render said power device operative to move the clutch to inoperative position and to release the clutch elements for movements toward operative position, said control means including means operative as the clutch elements approach fully operative position to retard the movement of such elements and to control the rate of movement of the clutch elements into engagement with each other in accordance with the rate of operation of the throttle of the motor vehicle engine in proportion to the engine speed.

12. Apparatus of the character described comprising a power device connected to an operating member of a motor vehicle clutch, control means operable to render said power device operative to move the clutch to inoperative position and to release the clutch elements for movement toward operative position, said control means including means automatically operative as the clutch elements approach fully operative position to modify the movement of such elements and including means for causing retarded movement of the clutch elements into engagement with each other controlled by the rate of operation of the throttle of the motor vehicle engine in proportion to the engine speed for controlling the rate of movement of the clutch elements into engagement with each other through said last named means.

13. The combination with a motor vehicle engine and a clutch therefor provided with an operating member and having a normal bias to operative position, of a power device connected to the clutch operating member, control means movable to render said power device operative to move the clutch to inoperative position and to release the clutch elements for movement toward operative position, said control means including means operative as the clutch elements approach fully operative position to retard the movement of such elements and including means for controlling the rate of movement of the clutch elements into engagement with each other in accordance with the rate of operation of the throttle of the motor vehicle engine in proportion to the engine speed.

14. The combination with a motor vehicle engine and a clutch therefor provided with an operating member and having a normal bias to operative position, of a power device connected to the clutch operating member, control means operable to render said power device operative to move the clutch to inoperative position and to release the clutch elements for movement toward operative position, said control means including means automatically operative as the clutch elements approach fully operative position to modify the movement of such elements and further including means for causing retarded movement of the clutch elements into engagement with each other controlled by the rate of operation of the throttle of the motor vehicle engine in proportion to the engine speed for controlling the rate of movement of the clutch elements into engagement with each other through said last named means.

EDWARD F. DICKIESON, Jr.

DISCLAIMER 2,084,387.—*Edward F. Dickieson, Jr.,* Detroit, Mich. CLUTCH OPERATING MECHANISM. Patent dated June 22, 1937. Disclaimer filed March 2, 1938, by the assignee, *Bendix Products Corporation.*

Hereby enters this disclaimer to claims 1 and 2 of said patent.
[*Official Gazette March 29, 1938.*]

DISCLAIMER 2,084,387.—*Edward F. Dickieson, Jr.,* Detroit, Mich. CLUTCH OPERATING MECHANISM. Patent dated June 22, 1937. Disclaimer filed April 3, 1939, by the assignee. *Bendix Products Corporation.*

Hereby enters this disclaimer to claims 3, 4, 5, and 11 of said patent.
[*Official Gazette May 2, 1939.*]

operative engagement in accordance with the rate of operation of the throttle of the vehicle engine in proportion to the engine speed.

10. The combination with a motor vehicle engine and a clutch therefor, of a differential pressure power device having a movable member connected to an operating member of the clutch, a control device operable to establish a pressure differential in said power device to move the clutch elements to inoperative position, said control device being normally positioned to establish pressure equalization in said power device and including means automatically operative upon initial engagement of the clutch elements for retarding the movement of such elements, said means including a valve for controlling the rate of movement of the clutch elements into operative engagement in accordnace with the rate of operation of the engine throttle in proportion to the engine speed.

11. Apparatus of the character described comprising a power device connected to an operating member of a motor vehicle clutch, control means movable to render said power device operative to move the clutch to inoperative position and to release the clutch elements for movements toward operative position, said control means including means operative as the clutch elements approach fully operative position to retard the movement of such elements and to control the rate of movement of the clutch elements into engagement with each other in accordance with the rate of operation of the throttle of the motor vehicle engine in proportion to the engine speed.

12. Apparatus of the character described comprising a power device connected to an operating member of a motor vehicle clutch, control means operable to render said power device operative to move the clutch to inoperative position and to release the clutch elements for movement toward operative position, said control means including means automatically operative as the clutch elements approach fully operative position to modify the movement of such elements and including means for causing retarded movement of the clutch elements into engagement with each other controlled by the rate of operation of the throttle of the motor vehicle engine in proportion to the engine speed for controlling the rate of movement of the clutch elements into engagement with each other through said last named means.

13. The combination with a motor vehicle engine and a clutch therefor provided with an operating member and having a normal bias to operative position, of a power device connected to the clutch operating member, control means movable to render said power device operative to move the clutch to inoperative position and to release the clutch elements for movement toward operative position, said control means including means operative as the clutch elements approach fully operative position to retard the movement of such elements and including means for controlling the rate of movement of the clutch elements into engagement with each other in accordance with the rate of operation of the throttle of the motor vehicle engine in proportion to the engine speed.

14. The combination with a motor vehicle engine and a clutch therefor provided with an operating member and having a normal bias to operative position, of a power device connected to the clutch operating member, control means operable to render said power device operative to move the clutch to inoperative position and to release the clutch elements for movement toward operative position, said control means including means automatically operative as the clutch elements approach fully operative position to modify the movement of such elements and further including means for causing retarded movement of the clutch elements into engagement with each other controlled by the rate of operation of the throttle of the motor vehicle engine in proportion to the engine speed for controlling the rate of movement of the clutch elements into engagement with each other through said last named means.

EDWARD F. DICKIESON, Jr.

DISCLAIMER 2,084,387.—*Edward F. Dickieson, Jr.,* Detroit, Mich. CLUTCH OPERATING MECHANISM. Patent dated June 22, 1937. Disclaimer filed March 2, 1938, by the assignee, *Bendix Products Corporation.*

Hereby enters this disclaimer to claims 1 and 2 of said patent.
[*Official Gazette March 29, 1938.*]

DISCLAIMER 2,084,387.—*Edward F. Dickieson, Jr.,* Detroit, Mich. CLUTCH OPERATING MECHANISM. Patent dated June 22, 1937. Disclaimer filed April 3, 1939, by the assignee. *Bendix Products Corporation.*

Hereby enters this disclaimer to claims 3, 4, 5, and 11 of said patent.
[*Official Gazette May 2, 1939.*]

DISCLAIMER 2,084,387.—*Edward F. Dickieson, Jr.*, Detroit, Mich. CLUTCH OPERATING MECHANISM. Patent dated June 22, 1937. Disclaimer filed March 2, 1938, by the assignee, *Bendix Products Corporation*.

Hereby enters this disclaimer to claims 1 and 2 of said patent.

[*Official Gazette March 29, 1938.*]

DISCLAIMER 2,084,387.—*Edward F. Dickieson, Jr.*, Detroit, Mich. CLUTCH OPERATING MECHANISM. Patent dated June 22, 1937. Disclaimer filed April 3, 1939, by the assignee. *Bendix Products Corporation.*

Hereby enters this disclaimer to claims 3, 4, 5, and 11 of said patent.
[*Official Gazette May 2, 1939.*]